(12) United States Patent
Lyon et al.

(10) Patent No.: US 7,278,894 B2
(45) Date of Patent: Oct. 9, 2007

(54) PROPELLER SHAFT ASSEMBLY WITH ENERGY ABSORBING MATERIAL

(75) Inventors: James Lyon, Northampton (GB); Brian Valovick, Royal Oak, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 23 days.

(21) Appl. No.: 11/272,553

(22) Filed: Nov. 10, 2005

(65) Prior Publication Data

US 2007/0105461 A1 May 10, 2007

(51) Int. Cl.
*B63H 23/34* (2006.01)
*F16D 3/00* (2006.01)

(52) U.S. Cl. .......................... 440/83; 464/146

(58) Field of Classification Search ............ 440/78, 440/83; 464/144–146, 167, 178, 179, 906; 180/381, 384, 902; 280/777
See application file for complete search history.

(56) References Cited

U.S. PATENT DOCUMENTS 6,585,601 B2 * 7/2003 Booker et al. ............. 464/146
6,666,771 B2 * 12/2003 Boutin ....................... 464/146
7,040,991 B2 * 5/2006 Kuczera et al. ............ 464/144
2005/0159226 A1 * 7/2005 Cermak ..................... 464/146

FOREIGN PATENT DOCUMENTS

EP          1346866 B1     5/2005

* cited by examiner

*Primary Examiner*—Lars A. Olson
*Assistant Examiner*—Daniel V. Venne
(74) *Attorney, Agent, or Firm*—Jennifer M. Brumbaugh; Mick A. Nylander

(57) ABSTRACT

A propeller shaft assembly comprises a connect shaft portion, a plungable constant velocity joint, and a hollow shaft portion with a cavity. An energy absorbing material is disposed within at least a portion of the cavity. The material absorbs energy when the constant velocity joint plunges into the hollow shaft portion when a predetermined force is exerted upon the constant velocity joint. The energy absorbing material may comprise a foam material, such as, an organic foam, a cellular foam, a synthetic foam, a metal foam, and the like. In addition to absorbing energy, the foam material minimizes the transmission of high frequency vibration of the propeller shaft assembly.

22 Claims, 4 Drawing Sheets

PROPELLER SHAFT ASSEMBLY WITH ENERGY ABSORBING MATERIAL

TECHNICAL FIELD

The present invention generally relates to a drive system for a motor vehicle and particularly, to a crash optimized propeller shaft assembly with energy absorbing material.

BACKGROUND OF THE INVENTION

Two-piece propeller shafts are commonly used in motor vehicle propulsion. The two-piece propeller shaft is used when larger distances exist between a front drive unit and the rear axle of the vehicle. The two-piece propeller shaft transmits torque from the front drive unit to a rear axle. A center-bearing and corresponding support bracket typically supports the two-piece propeller shafts. The center-bearing and support bracket maintain the center of the propeller shaft while still allowing the drive shaft to rotate and transfer mechanical energy from the front drive unit to the rear axle.

Besides transferring mechanical energy, it is desirable for propeller shafts to have adequate crash worthiness. It is advantageous for the propeller shaft to be shortened axially to prevent it from buckling, penetrating the passenger compartment, or damaging other vehicle components in close proximity to the propeller shaft. As well, it is desirable for the propeller shaft to absorb a considerable amount of the deformation energy.

SUMMARY OF THE INVENTION

According to an embodiment, a propeller shaft assembly comprises a connect shaft portion, a hollow shaft portion including a cavity, and an energy absorbing material disposed within at least a portion of the cavity.

In another embodiment, a propeller shaft assembly comprises a forward region defined by a connect shaft portion, a rearward region defined by a hollow shaft portion, the hollow shaft portion having a cavity, an energy absorbing material disposed within at least a portion of the cavity, and a plungable region including a constant velocity joint, wherein the forward region and the rearward region are operatively connected to the plungable region, and wherein at least a portion of the plungable region collapses into the rearward region when a predetermined force is exerted onto the constant velocity joint.

In another embodiment, a propeller shaft assembly comprises a forward region defined by a connect shaft portion, a plungable region including a constant velocity joint, a rearward region defined by a hollow shaft portion, the hollow shaft portion having a cavity, an energy absorbing material disposed within at least a portion of the cavity, and a grease cap disposed within the hollow shaft portion, wherein the forward region and the rearward region are operatively connected to the constant velocity joint, and wherein at least a portion of the plungable region collapses into the rearward region when a predetermined force is exerted onto the constant velocity joint.

DETAILED DESCRIPTION

Figure 1:
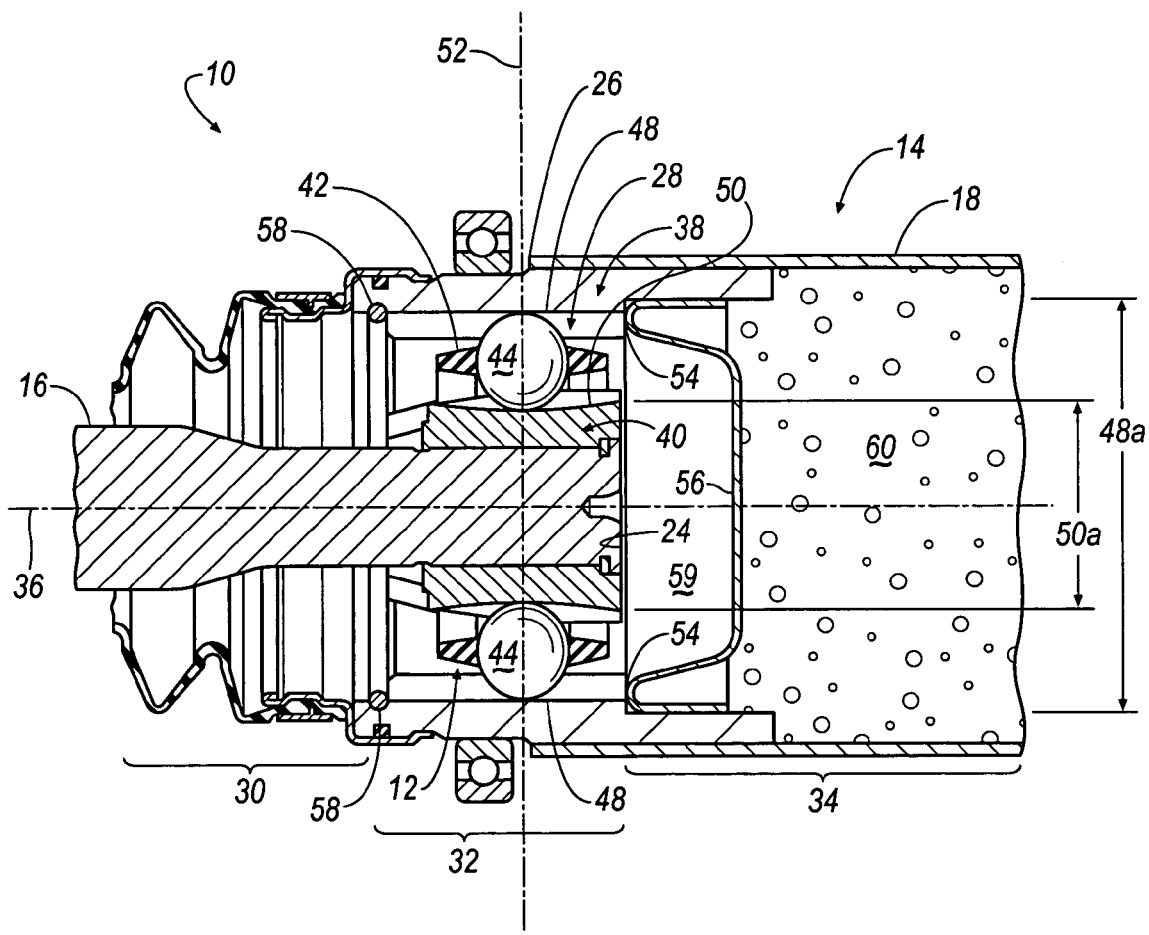
FIG. 1 is a cross-sectional view of a propeller shaft assembly with an energy absorbing material according to an embodiment of the invention.

Referring to the Figures, a shaft assembly 10, such as a propeller shaft assembly and the like, is illustrated according to an embodiment of the invention. The shaft assembly 10 comprises a crash optimized plunging constant velocity (CV) joint 12 disposed within a shaft 14. As illustrated, shaft 14 includes two shaft portions, a connect shaft portion 16 and a hollow shaft portion 18, with the CV joint 12 being disposed within the hollow shaft portion 18. However, it can be appreciated the invention may be practiced with any desired number of shaft portions.

One end of connect shaft portion 16 may be connected to a drive unit (not shown), such as, for example, a transmission of a vehicle, and one end of hollow shaft portion 18 may be connected to a rear axle gearbox of the vehicle (not shown) as is known in the art. The other ends 24, 26 of connect and hollow shafts 16, 18, respectively, may be operatively coupled together by CV joint 12. As a result, a portion of connect shaft portion 16 may be located within a cavity 28 of hollow shaft portion 18. When joined together, three regions may distinguish shaft assembly 10—a forward region 30, a plungable region 32 and a rearward region 34.

Forward region 30 may be defined by a portion of connect shaft portion 16; plungable region 32 includes CV joint 12 in which the connect shaft portion 16 and hollow shaft portion 18 may overlap each other; and rearward region 34 may be defined by a portion of hollow shaft portion 18, as shown in FIG. 1.

CV joint 12 may be plungable along a center axis 36. CV joint 12 comprises an outer joint member 38, an inner joint member 40, and a ball cage 42 including a plurality of torque transmitting balls 44, each held in individual cage windows. The torque transmitting balls 44 may provide rotatable support for CV joint 12. Outer joint member 38 includes an outer ball track 48 having a predetermined diameter 48a and inner joint member 40 includes an inner ball track 50 having a predetermined diameter 50a. Hollow shaft portion 18 may be connected to outer joint member 38, while connect shaft portion 16 may be connected to inner joint member 40.

Although inner ball track 50 is shown as being arcuate in shape, it can be appreciated that inner ball track 50 may also have a constant diameter along center axis 36. In a similar manner, although outer ball track 48 is shown as having a constant diameter along center axis 36, outer ball track 48 may be arcuate in shape.

Cage windows may hold torque-transmitting balls 44 in a plane 52 when inner joint member 40 is axially displaced or articulated. Torque transmitting balls 44 are each guided by outer and inner ball tracks 48, 50. Outer and inner ball tracks 48, 50 operatively work together to prevent lateral movement of connect shaft portion 16 within hollow shaft portion 18, while allowing axial movement along center axis 36.

Connect shaft portion 16 may displace in an axial direction along axis 36. Connect shaft portion 16 may have limited movement in rearward region 34 because of a grease cap 56. Grease cap 56 includes a first stop 54 to limit the movement of connect shaft portion 16 in rearward region 34. Connect shaft portion 16 may have limited movement in forward region 30 because of a second stop 58. Further, when the outer joint member 38 is displaced relative to the inner joint member 40, connect shaft portion 16 may be limited in displacement to the operating range defined by the length of outer ball track 48 between first and second stops 54, 58.

The grease cap 56 may also act as a seal to prevent grease within the CV joint 12 from escaping and prevent contaminants from within the hollow shaft portion 18, such as dirt, debris, and the like, from entering the CV joint 12. Grease cap 56, as shown, may be press-fit into an open end of outer joint member 38. It can be appreciated that the grease cap 56 may be attached using any method known in the art. Grease cap 56 may conform to the general shape of ball cage 42 and includes a cavity 59. Cavity 59 provides a space for inner joint member 40 and ball cage 42 to travel when CV joint 12 and connect shaft portion 16 plunge into hollow shaft portion 18 along center axis 36. The grease cap 56 may also prevent CV joint 12 from over compressing during normal operation, thereby preventing ball cage 42 from exceeding the length of the outer ball track 48 and possibly dismantling.

Grease cap 56 may be made of various materials including, for example, aluminum, steal, plastic, ceramic, rubber, or other material that may be released under a predetermined load. Although first stop 54, as illustrated, is part of the grease cap 56, alternative embodiments of stops that serve the same or similar function may be incorporated.

As illustrated, second stop 58 is located between forward region 30 and plungable region 32 and may also act as a seal between forward and plungable regions 30, 32. Second stop 58 may also prevent CV joint 12 from plunging into forward region 30. Second stop 58 may be, for example, a rigid boot, a rolling boot, a curvature in outer ball tracks 48, or the like.

One aspect of the invention is that the shaft assembly 10 includes a means for absorbing energy, such as an energy absorbing material 60, which is disposed within a portion of cavity 28 of hollow shaft portion 18. Material 60 absorbs energy generated during plunging of connect shaft portion 16 into hollow shaft portion 18 by undergoing plastic deformation, elastic deformation, brittle fracture, or by the fluid dynamics of gases or liquids within material 60. For example, energy absorbing material 60 may be an organic foam, cellular foam, synthetic foam, such as, expanded polystyrene, polyurethanes, polyethers, or polyethylene, and the like. In another example, material 60 may be an energy absorbing metal foam, such as, for example, stabilized aluminum foam, and the like.

It will be appreciated that the energy absorbing material 60 can be a combination of two or more types of foam materials. For example, one type of foam material may be located proximate the grease cap 56, while another type of foam material may located distal the grease cap 56. Other arrangements of various types of foam material are within the scope of the invention.

As illustrated, energy absorbing material 60 may fill a portion of cavity 28 of hollow shaft portion 18. In another embodiment, energy absorbing material 60 may be in the form of a coating applied to the periphery of hollow shaft portion 18. By varying the density and composition of material 60, the amount of force and length of displacement of the CV joint 12 may be accounted for in the design of shaft assembly 10. Further, it can be appreciated that the amount of material, whether filled or coated, within cavity 28 may be dependent upon the energy absorbing properties of material 60, the amount of energy to be absorbed by material 60, and other factors.

Figure 2:
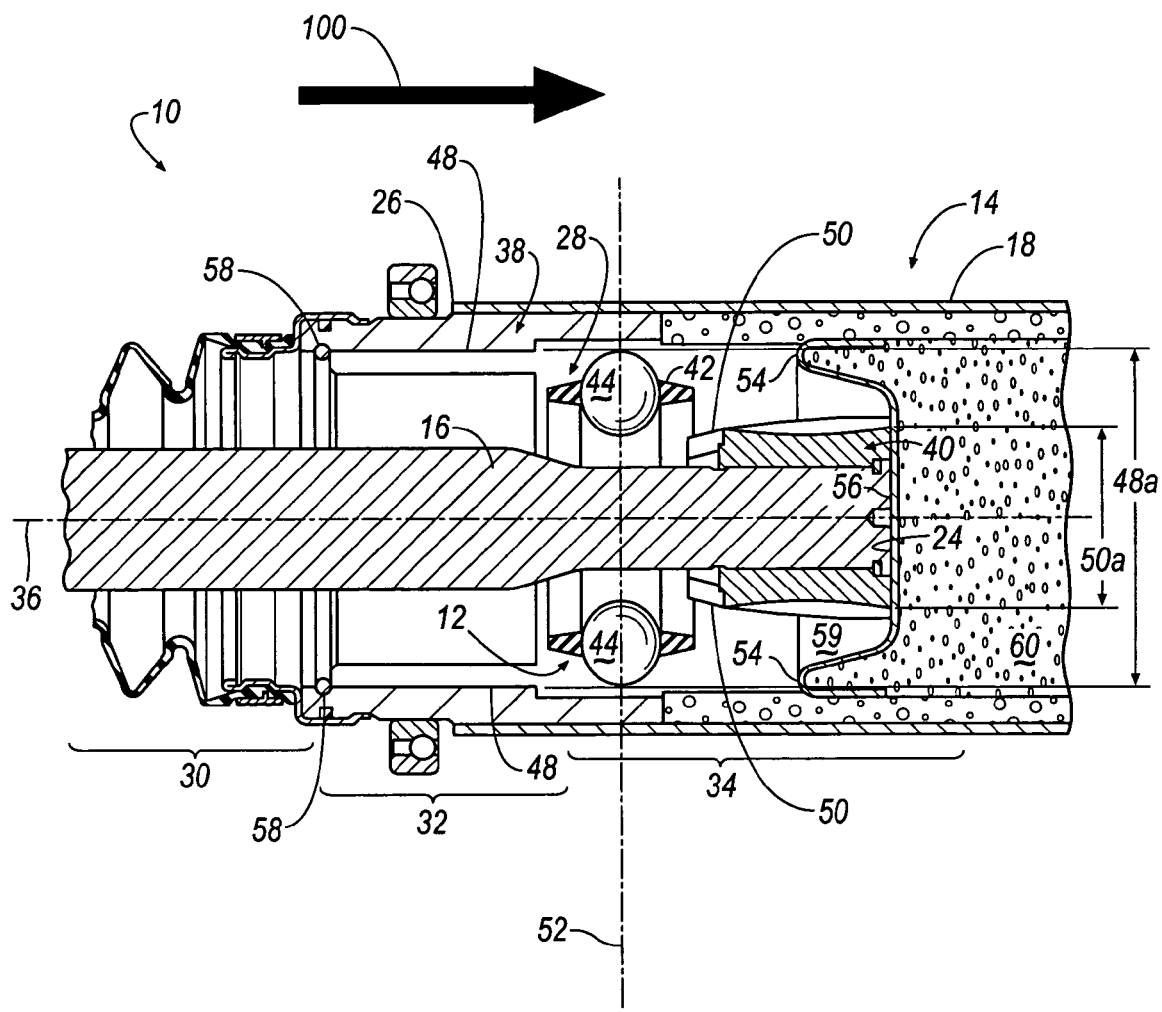
FIG. 2 is a cross-sectional view of the propeller shaft assembly in a collapsed situation according to an embodiment of the invention.
Figure 3:
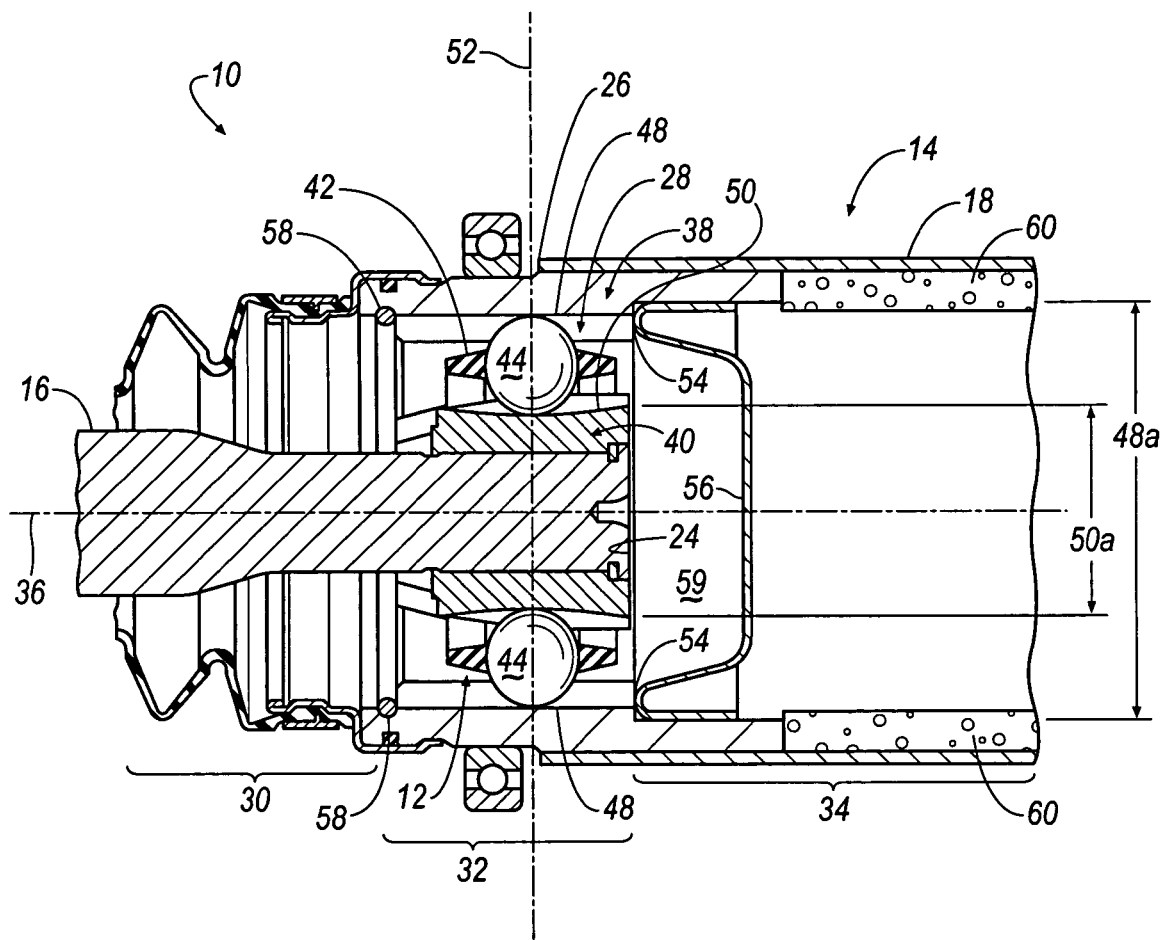
FIG. 3 is a cross-sectional view of the propeller shaft assembly with an energy absorbing material according to another embodiment of the invention.

During forcible loads above a predetermined amount, connect shaft portion 16 releases first stop 54 and plunges, or collapses, into hollow shaft portion 18. Connect shaft portion 16 collapses into hollow shaft portion 18 in the general direction of arrow 100 (FIG. 2). The collapsing action occurs, due partly, to the diameter of connect shaft portion 16 being generally smaller than the diameter of hollow shaft portion 18. The collapsing of the connect shaft portion 16 into hollow shaft portion 18, in turn, may cause material 60 to compress, constrict or deform. As material 60 compresses, for example, material 60 absorbs a portion of the energy transferred from the collapsing CV joint 12.

As described above, the material 60 absorbs energy when the connect shaft portion 16 collapses into the hollow shaft portion 18. The amount of energy absorption can be selectively adjusted by varying the material properties of the material 60, the amount of material 60 disposed within the hollow shaft portion 18, as well as other factors known to those skilled in the art. In addition to absorbing energy, the material 60 can help minimize the transmission of high frequency vibration of the propeller shaft assembly 10, particularly when used as a coating. Thus, the material 60 serves a dual purpose: 1) energy absorption, and 2) dampening of high frequency vibration.

Figure 4:
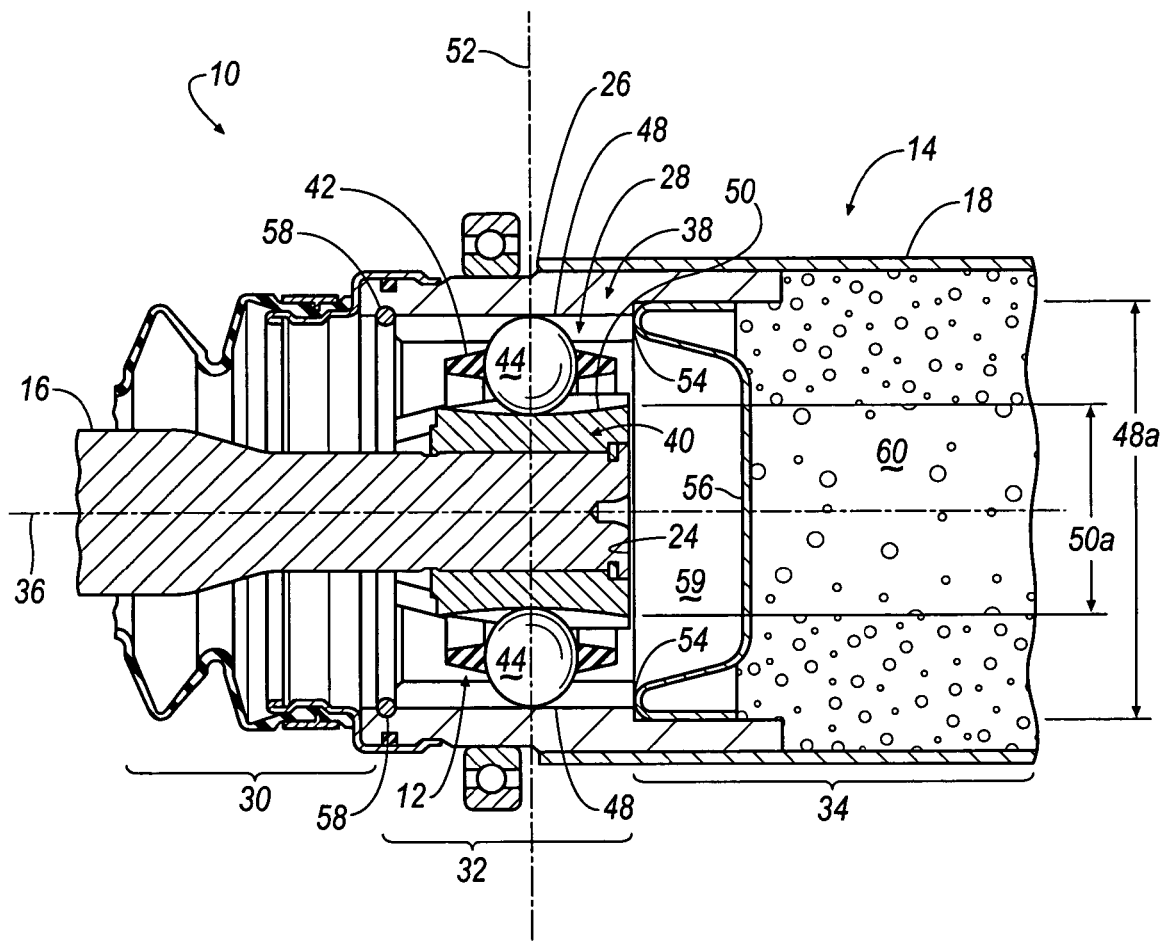
FIG. 4 is a cross-section view of a propeller shaft assembly with an energy absorbing material according to another embodiment of the invention.

Further, the foam material 60 may comprise a plurality of material densities, as shown in FIG. 4. For example, a relatively higher density material 60 may be applied as a coating to help minimize the transmission of high frequency vibration, while a relatively lower density material 60 may be applied to fill the entire hollow shaft portion 18. In another example, a relatively lower density material 60 may be applied as a coating, while a relatively higher density material 60 may be applied to fill the entire hollow shaft portion 18 to maximize the amount of energy absorbed by the material 60. Other configurations are within the scope of the invention.

While the invention as described relates to an apparatus for absorbing energy within a propeller shaft of a vehicle, the invention is capable of being adapted for various purposes including, for example, motor systems that use a propeller shaft, or other vehicle and non-vehicle applications that require energy absorption within a propeller shaft.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A propeller shaft assembly comprising:
   a connect shaft portion;
   a hollow shaft portion including a cavity;
   a plungable constant velocity joint disposed within the cavity of the hollow shaft portion;
   an energy absorbing material disposed within at least a portion of the cavity of the hollow shaft portion;
   a separate grease cap disposed between the plungable constant velocity joint and the energy absorbing material such that the grease cap selectively limits movement of the connect shaft portion within the energy absorbing material; and
   wherein the energy absorbing material absorbs at least a portion of the energy generated during movement of the connect shaft portion within the energy absorbing material.

2. A propeller shaft assembly as in claim 1, wherein the energy absorbing material comprises a foam material.

3. A propeller shaft assembly as in claim 2, wherein the energy absorbing material comprises a metal foam.

4. A propeller shaft assembly as in claim 1, wherein the energy absorbing material undergoes plastic deformation when the connect shaft portion moves within the cavity of the hollow shaft portion.

5. A propeller shaft assembly as in claim 1, wherein the energy absorbing material undergoes elastic deformation when the connect shaft portion moves within the cavity of the hollow shaft portion.

6. A propeller shaft assembly as in claim 1, wherein the energy absorbing material is disposed around at least a portion of the periphery of the cavity.

7. A propeller shaft assembly as in claim 1, wherein the energy absorbing material comprises a plurality of densities.

8. A propeller shaft assembly comprising:
a forward region defined by a connect shaft portion;
a rearward region defined by a hollow shaft portion, the hollow shaft portion having a cavity;
a grease cap including a first stop which selectively limits the movement of the forward region;
an energy absorbing material separate from the grease cap, wherein the energy absorbing material is disposed within at least a portion of the cavity; and
a plungable region including a constant velocity joint;
wherein the forward region and the rearward region are operatively connected to the plungable region;
wherein at least a portion of the plungable region collapses into the rearward region when the first stop is selectively released by a predetermined force exerted on the constant velocity joint, and the energy absorbing material absorbs at least a portion of the energy from the grease cap.

9. A propeller shaft assembly as in claim 8, wherein the energy absorbing material comprises a foam material.

10. A propeller shaft assembly as in claim 9, wherein the energy absorbing material comprises a metal foam.

11. A propeller shaft assembly as in claim 8, wherein the energy absorbing material undergoes plastic deformation when a portion of the plungable region plunges into the rearward region.

12. A propeller shaft assembly as in claim 8, wherein the energy absorbing material undergoes elastic deformation when a portion of the plungable region plunges into the rearward region.

13. A propeller shaft assembly as in claim 8, wherein the energy absorbing material is disposed around at least a portion of the periphery of the cavity.

14. A propeller shaft assembly as in claim 8, wherein the energy absorbing material comprises a plurality of densities.

15. A propeller shaft assembly comprising:
a forward region defined by a connect shaft portion;
a plungable region including a constant velocity joint;
a rearward region defined by a hollow shaft portion, the hollow shaft portion having a cavity;
an energy absorbing material disposed within at least a portion of the cavity; and
a grease cap separate from the energy absorbing material and disposed within the hollow shaft portion;
wherein the forward region and the rearward region are operatively connected to the constant velocity joint, and wherein at least a portion of the plungable region collapses into the rearward region when a predetermined force is exerted on the constant velocity joint, and the energy absorbing material absorbs at least a portion of energy generated when the grease cap collapses into the rearward region.

16. A propeller shaft assembly as in claim 15, wherein the energy absorbing material comprises a foam material.

17. A propeller shaft assembly as in claim 16, wherein the energy absorbing material comprises a metal foam.

18. A propeller shaft assembly as in claim 15, wherein the energy absorbing material undergoes plastic deformation when a portion of the plungable region plunges into the rearward region.

19. A propeller shaft assembly as in claim 15, wherein the energy absorbing material undergoes plastic deformation when a portion of the plungable region plunges into the rearward region.

20. A propeller shaft assembly as in claim 15, wherein the energy absorbing material is disposed around at least a portion of the periphery of the cavity.

21. A propeller shaft assembly as in claim 15, wherein the energy absorbing material comprises a plurality of densities.

22. A propeller shaft assembly as in claim 15, wherein the grease cap includes a stop for preventing the constant velocity joint from dismantling when the plungable region plunges into the rearward region.

* * * * *